United States Patent
Valencia et al.

(10) Patent No.: US 6,688,518 B1
(45) Date of Patent: Feb. 10, 2004

(54) WALL-MOUNTED TOUCH SCREEN INFORMATION SYSTEM

(76) Inventors: Anthony Valencia, 3754 Saint Andrews Dr., Santa Rosa, CA (US) 95403; Mary Valencia, 3754 Saint Andrews Dr., Santa Rosa, CA (US) 95403; Brady Phenicie, 3475 Dry Creek Rd., Healdsburg, CA (US) 95448

( * ) Notice: Subject to any disclaimer, the term of this patent is extended or adjusted under 35 U.S.C. 154(b) by 141 days.

(21) Appl. No.: 10/062,372

(22) Filed: Jan. 31, 2002

(51) Int. Cl.$^7$ .............................................. G06F 17/60
(52) U.S. Cl. ...................................... 235/379; 235/380
(58) Field of Search .............................. 235/376, 379, 235/380, 381; 902/8, 9, 10, 30, 31; 705/5, 26, 27, 42, 43; 52/36.1

(56) References Cited

U.S. PATENT DOCUMENTS

| | | | |
|---|---|---|---|
| 4,179,723 A | | 12/1979 | Spencer |
| 4,247,759 A | | 1/1981 | Yuris et al. |
| RE32,115 E | | 4/1986 | Lockwood et al. |
| 4,902,881 A | | 2/1990 | Janku |
| 5,017,026 A | * | 5/1991 | Takesako et al. ............. 400/24 |
| 5,393,964 A | | 2/1995 | Hamilton et al. |
| 5,483,047 A | * | 1/1996 | Ramachandran et al. ... 235/379 |
| 5,602,905 A | | 2/1997 | Mettke |
| 5,732,398 A | | 3/1998 | Tagawa |
| 5,740,744 A | * | 4/1998 | Nashirozawa et al. ...... 109/24.1 |
| 5,845,256 A | * | 12/1998 | Pescitelli et al. .............. 705/4 |
| 5,877,746 A | | 3/1999 | Parks et al. |
| 5,946,660 A | * | 8/1999 | McCarty et al. ............... 705/5 |
| 5,984,177 A | * | 11/1999 | Do et al. ..................... 235/379 |
| 6,078,848 A | | 6/2000 | Bernstein et al. |
| 6,118,860 A | | 9/2000 | Hillson et al. |
| 6,505,774 B1 | * | 1/2003 | Fulcher et al. .............. 235/381 |
| 2002/0024590 A1 | * | 2/2002 | Pena ....................... 348/14.08 |
| 2002/0124271 A1 | * | 9/2002 | Herrmann et al. .......... 725/151 |
| 2002/0194793 A1 | * | 12/2002 | Bowron ...................... 52/36.1 |

* cited by examiner

*Primary Examiner*—Diane I. Lee
(74) *Attorney, Agent, or Firm*—Larry D. Johnson; Craig M. Stainbrook; Johnson & Stainbrook, LLP (57) ABSTRACT

A wall-mounted touch screen information system includes a rugged housing with a hinged front cover. The housing is compact enough for wall mounting. A single board computer inside the housing is connected to a touch screen, a CCD camera, a card reader, and a spool printer attached to the front cover. A telephone handset is supported in a cradle attached to the side of the housing. The handset is connected to audio ports on the single board computer by an armored cable. A modem and Ethernet are provided on the single board computer for voice and network communications. A CD drive connected to the single board computer enables different software to be installed for performing a variety of communication, information retrieval, and financial functions. All the external components of the system are made of materials strong enough to withstand abuse and vandalism.

6 Claims, 6 Drawing Sheets

WALL-MOUNTED TOUCH SCREEN INFORMATION SYSTEM

BACKGROUND OF THE INVENTION

1. Field of the Invention

This invention relates generally to computers.

2. Prior Art

Kiosks are commonly used for providing a variety of services, including financial, telephone, and information services. The most common type of kiosk is the ATM, which is a large, expensive, and immobile machine. An example of an ATM is disclosed in U.S. Pat. No. 4,179,723 to Spencer. Although smaller kiosks are disclosed in U.S. Pat. No. 6,118,860 to Hillson et al.; U.S. Pat. No. 5,732,398 to Tagawa; U.S. Pat. No. 4,902,881 to Janku; and U.S. Pat. No. 4,247,759 to Yuris et al., they are still quite large and expensive. Other kiosks disclosed in U.S. Pat. No. 6,078,848 to Bernstein et al. and U.S. Pat. No. 5,602,905 to Mettke are comprised of conventional personal computers inside specially designed cabinets. Suitable locations for installation of the smaller conventional kiosks are limited because they are still relatively large and cumbersome. Also, their conventional keyboards and mice input devices are too fragile for environments where they may be subject to abuse and vandalism. Further, a typical kiosk is dedicated to performing a single function, such as dispensing cash, providing Internet access, etc. The market for a dedicated kiosk is thus limited.

BRIEF SUMMARY OF THE INVENTION

The objects of the present touch screen information system are:

- to be small enough for wall mounting at a variety of locations;
- to be rugged enough to resist abuse and vandalism;
- to provide a touch screen with audio feedback;
- to enable voice communication with a remote party;
- to enable Internet browsing;
- to enable making payment for services;
- to record an image of the user and upload it to a server;
- to print a receipt for financial transactions; and
- to be easily installable with different software for performing different functions.

A wall-mounted touch screen information system is comprised of a rugged housing with a hinged front cover. The housing is compact enough for wall mounting. A single board computer inside the housing is connected to a touch screen, a CCD camera, a card reader, and a spool printer attached to the front cover. A telephone handset is supported in a cradle attached to the side of the housing. The handset is connected to audio ports on the single board computer by an armored cable. A modem and Ethernet are provided on the single board computer for voice and network communications. A CD drive connected to the single board computer enables different software to be installed for performing a variety of communication, information retrieval, and financial functions. All the external components of the system are made of materials strong enough to withstand abuse and vandalism.

DRAWING REFERENCE NUMERALS

| No. | Description | No. | Description |
|---|---|---|---|
| 10. | Housing | 11. | Front Cover |
| 12. | Hinges | 13. | Handset |
| 14. | Cradle | 15. | Armored Cable |
| 16. | Touch Screen | 17. | Opening |
| 18. | Camera | 19. | Opening |
| 20. | One-Way Mirror | 21. | Card Reader |
| 22. | Opening | 23. | Printer |
| 24. | Opening | 25. | Cover |
| 26. | Lock | 27. | Slot |
| 28. | Lock | 29. | Rear Surface |
| 30. | Stud | 31. | Hole |
| 32. | Notch | 33. | Conduit |
| 34. | Cable Opening | 35. | Ventilation Hole |
| 36. | Single Board Computer | 37. | Memory |
| 38. | Floppy Drive | 39. | Hard Disk |
| 40. | CD Drive | 41. | Fan |
| 42. | Power Supply | 43. | Power Switch |
| 44. | Ventilation Slots | 45. | Bottom |
| 46. | LCD Panel | 47. | Touch Panel |
| 48. | CPU | 49. | Video |
| 50. | Ethernet | 51. | IDE |
| 52. | Audio | 53. | Modem |
| 54. | Keyboard Port | 55. | Mouse Port |
| 56. | USB Ports | 57. | Parallel Port |
| 58. | Microphone In | 59. | Speaker Out |
| 60. | Com Ports | 61. | Speaker |
| 70–86. | Flowchart Blocks | | |

DETAILED DESCRIPTION OF THE INVENTION

Figure 1:
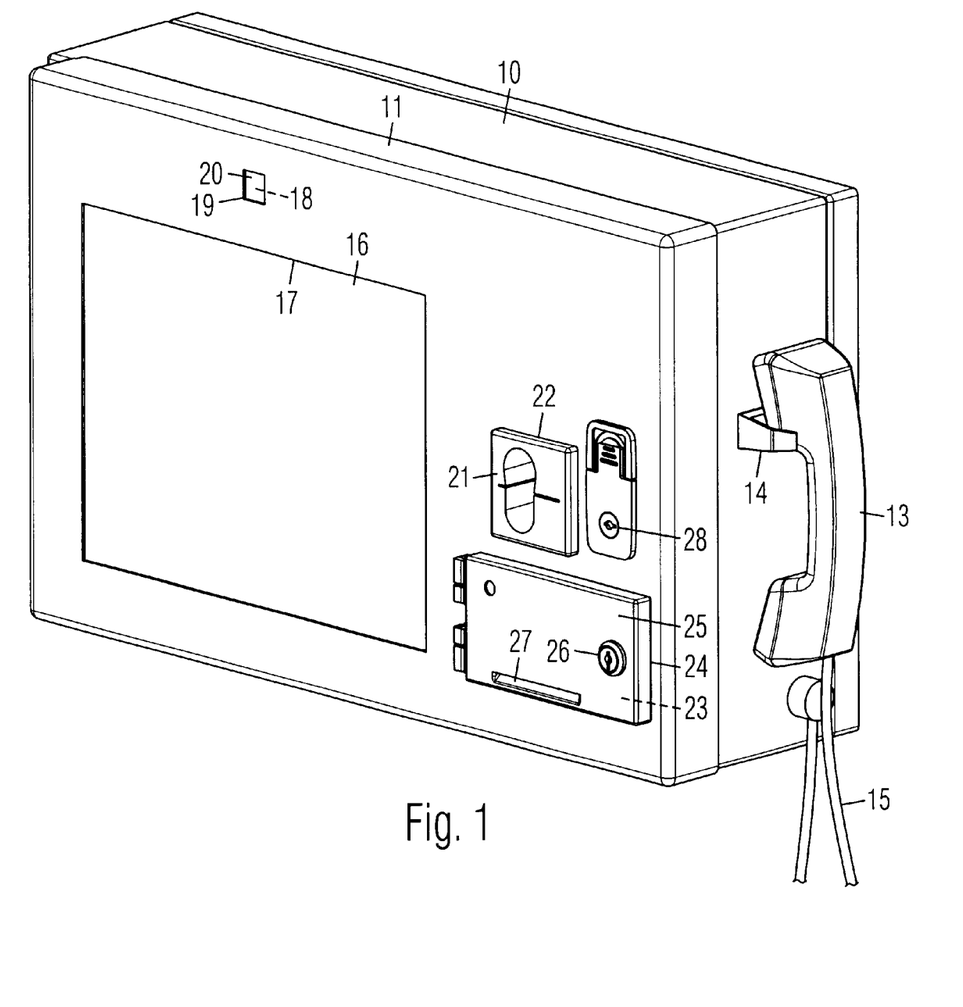
FIG. 1 is a left perspective view of the present wall-mounted touch screen information system.
Figure 2:
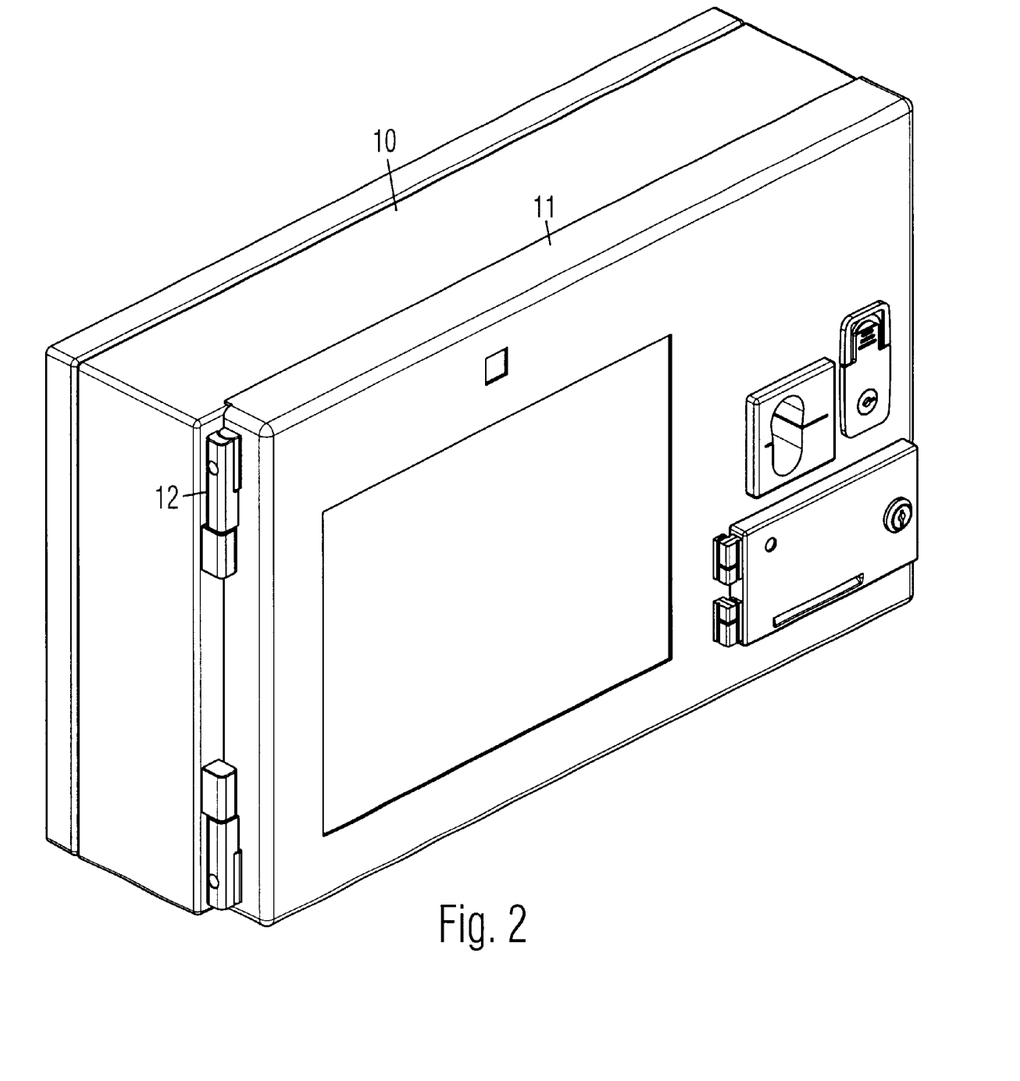
FIG. 2 is a right perspective view thereof.

FIGS. 1–2

A preferred embodiment of the present wall-mounted touch screen information system is shown in front perspective views in FIGS. 1 and 2. It is comprised of a rectangular housing 10 made of a strong sheet metal. Housing 10 is preferably about 23 inches wide by about 14 inches tall, which is compact enough for mounting in a great variety of locations. A front cover 11 is hinged to housing 10 by tamper resistant hinges 12 (FIG. 2), preferably on the left side because a telephone handset 13 is supported in a cradle 14 attached to the right side of housing 10. Handset 13 is comprised of a rugged handset of the type used on payphones, and is connected to housing 10 by an armored cable 15.

A touch screen 16 is attached behind a rectangular opening 17 in front cover 10. A CCD camera 18 is attached behind a smaller rectangular 19 opening in front cover, and behind a dark one-way mirror 20 to avoid detection. A card reader 21 is attached through an opening 22 in front cover 10. A spool printer 23 is attached behind an opening 24 in front cover 10. The front of printer 23 is covered by a tamper resistant metal printer cover 25 which is hinged to the surface of front cover 10 and secured by a printer cover lock 26. A slot 27 on printer cover 25 is arranged for dispensing printed receipts. A front cover lock 28 is attached to front cover 11 for securing it to housing 10. There is no externally accessible power switch, mechanical keyboard, pointing device, or mechanical telephone keypad.

All the external components of the system are made of materials strong enough to resist abuse and vandalism.

Therefore, the system is suitable for installation in unfriendly environments such as arraignment facilities in police departments, jails, and prisons, as well as any other environment which allows unsupervised public access to the system.

Figure 3:
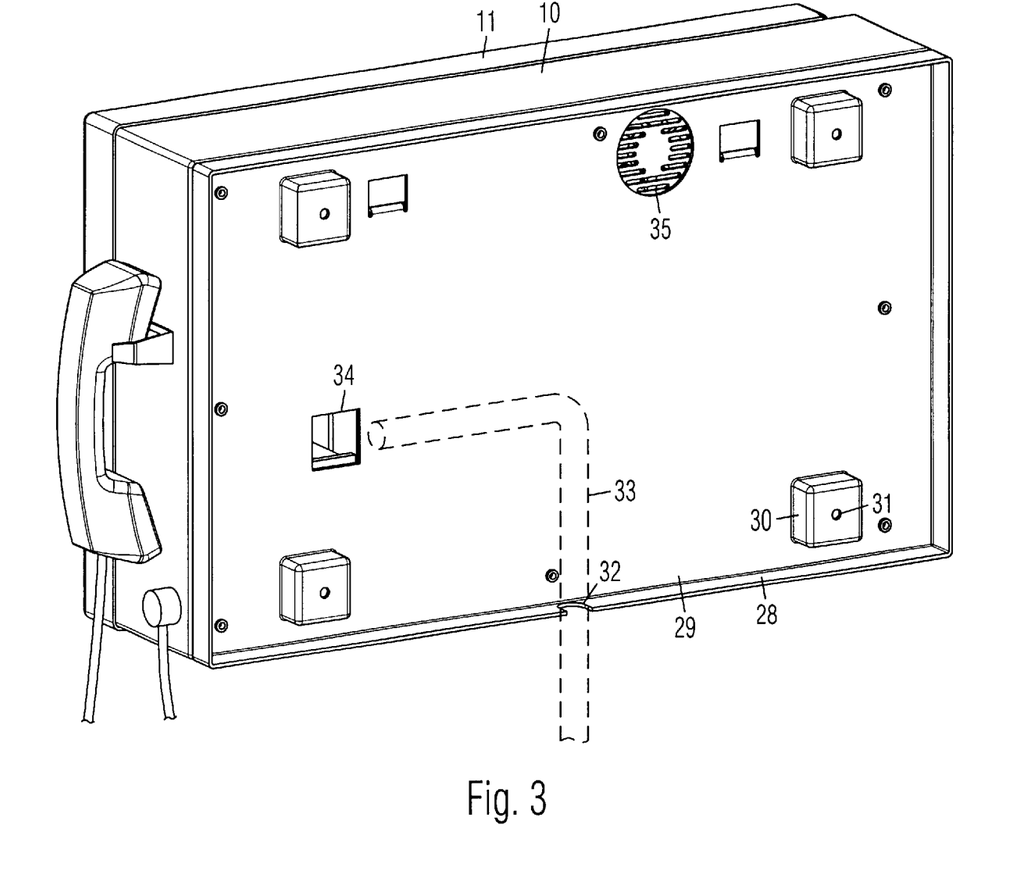
FIG. 3 is a rear perspective view thereof.

FIG. 3

The system is shown in a rear view in FIG. 3. A rearward projecting lip 28 is arranged around the rear perimeter of housing 10 to space a rear surface 29 of housing 10 from the mounting wall. Rearward projecting studs 30 are arranged on rear surface 29 of housing 10. The rear surfaces of studs 30 are coplanar with the rear edge of lip 29. Holes 31 on studs 30 allow mounting screws or bolts to be inserted from the inside of housing 10 and into wall, so that the screws or bolts are protected from tampering when cover 11 is closed and locked. A notch 32 on lip 28 at the bottom of housing 10 enables the passage of an electrical conduit 33 mounted on the surface of the wall. Power and communication cables that emerge from electrical conduit 33 are threaded through a cable opening 34 on rear surface 29 of housing 10. Electrical cables which emerge from the wall without the conduit can be threaded through cable opening 34 without being passed through notch 32. A fan ventilation hole 35 is arranged on rear surface 29 of housing 10.

Figure 4:
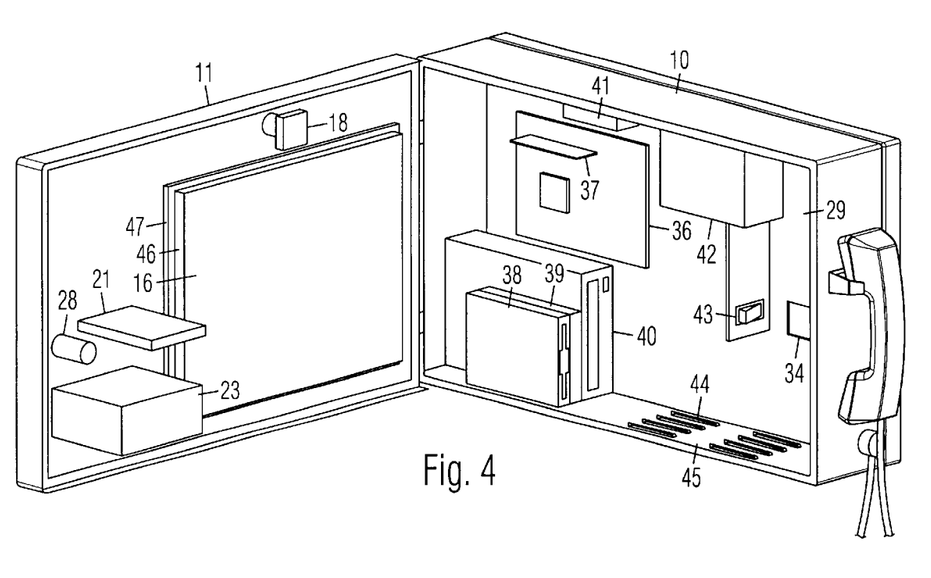
FIG. 4 is a front perspective view thereof with a cover opened.

FIG. 4

The system is shown with cover 11 opened in a front perspective view in FIG. 4. A single board computer 36 is attached inside housing 10. Single board computer 36 is comprised of a highly integrated circuit board with many built-in features which are usually provided by add-on boards in desktop personal computers. Single board computer 36 preferably has an EBX form factor, which is only about 5.75 inch ×8 inch. It is thus much more compact than a conventional personal computer motherboard with orthogonal expansion cards. The only necessary orthogonal card on single board computer 36 is a small memory module 37.

In addition to single board computer 36, a floppy drive 38, a hard disk 39, a CD drive 40, a fan 41, a power supply 42, and a power switch 43 are attached inside housing 10. Cable opening 34 is positioned through the back of housing 10, and ventilation holes 44 are positioned through bottom surface 45 of housing 10. Ventilation holes are of a small size for minimizing RF interference, and are preferably on the bottom of housing 10 to minimize dust intrusion and resist vandalism. Power switch 43 is connected between power supply 42 and the AC power cable from cable opening 34. Power switch 43 is left on when cover 11 is closed.

Touch screen 16 is attached to the rear of hinged cover 11. Touch screen 16 is comprised of a color LCD panel 46 positioned behind a transparent touch panel 47. LCD panel 46 is preferably comprised of a 15 inch TFT screen with 1024×768 resolution. Touch panel 47 is preferably comprised of the "INTELLITOUCH" system sold by Elo, with a 0.25 inch "SECURETOUCH" glass panel with is strong enough to resist abuse. Further, the glass panel is preferably treated with the "PANEL-GUARD" process by Reptron to avoid fragmentation if broken.

Color CCD camera 18 with composite video output is attached to the rear of cover 11. Camera 18 is preferably centered above touch screen 16 for a direct view of the user standing in front of the screen. Card reader 21 is attached to the rear of cover 11 lateral to touch screen 16. Card reader 21 is preferably comprised of a combined magnetic card and smart card reader capable of reading magnetic strip cards, such as credit cards, ATM cards, and driver's licenses, and also capable of reading smart cards with embedded micro-processors. Printer 23 is attached to the rear of cover 11 for printing receipts. Printer 23 is preferably encased in a hard polycarbonate case for durability, and is preferably a dot matrix printer for flexibility in producing different fonts, including fonts in different languages, and for producing graphics. Lock 28 is positioned through cover 11 adjacent card reader 21.

Figure 5:
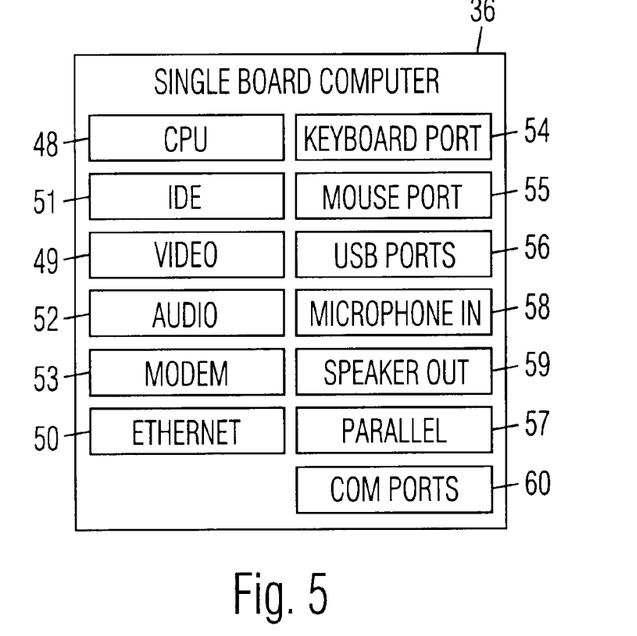
FIG. 5 and FIG. 6 are a block diagram thereof.

FIG. 5

A block diagram of single board computer 36 is shown in FIG. 5. It is preferably comprised of an EBX form factor board that supports PC/104 and PC/104-Plus module expansion, such as the model "PCM-9550F/FM" computer by Advantech. Integrated features on single board computer 36 include a CPU 48 which is preferably an Intel "PENTIUM" operating at 266 MHz, a PCI video controller 49 capable of driving the LCD at its native resolution, a PCI 10/100Base-T Ethernet interface 50, an IDE controller 51, an audio controller 52, a full-duplex fax/modem 53, a keyboard port 54, a mouse port 55, USB ports 56, a parallel port 57, a microphone-in connector 58, speaker-out connector 59, and com ports 60. Single board computer 36 also includes a memory slot for attaching a RAM module, and preferably a PC/104-Plus expansion slot for adding an expansion board. All the ports and slots are integrated on single board computer, and are not accessible when the front cover is closed.

The modem is for connecting to a telephone line for fax and modem communications, including voice calls and dialup Internet service. The Ethernet interface is for connecting to a network, such as a local area network or the Internet. In case of connecting to the Internet, the Ethernet is for connecting to a broadband connection, such as a DSL telephone line through a DSL modem, or a coaxial cable through a cable modem. The keyboard and mouse ports are used only when the cover is opened and the unit is being serviced by a technician.

Figure 6:
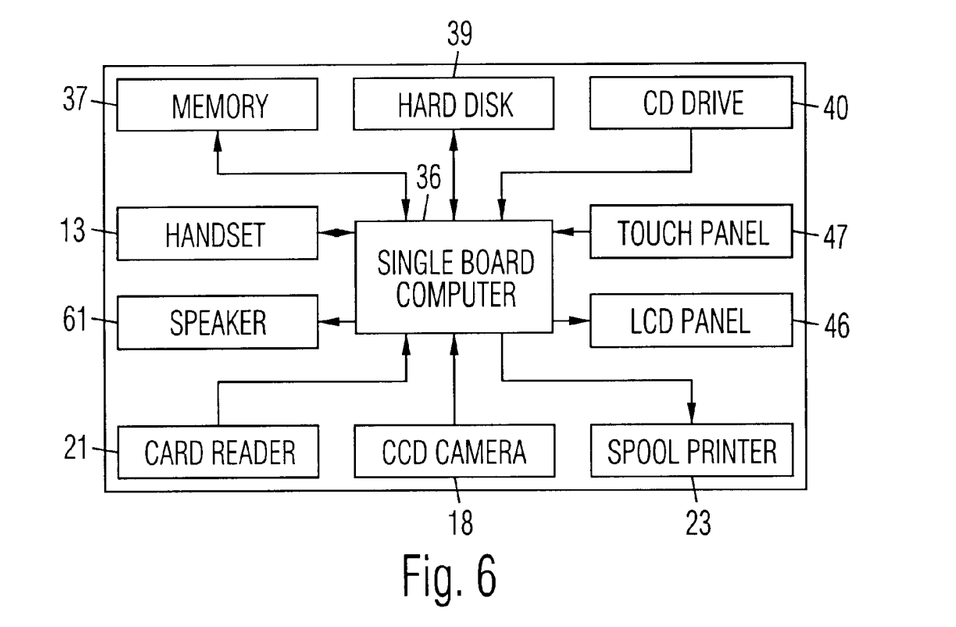

FIG. 6

A block diagram of the system is shown in FIG. 6. Memory 37 is attached to the memory slot, hard disk 39 and CD drive 40 are connected to the IDE connector, LCD panel 46 is connected to the video connector, touch panel 47 is connected to a com port or a USB port, printer 23 is connected to the parallel port or a USB port, CCD camera 18 is connected to a USB port or a video-in port, card reader 21 is connected to a com port or USB port, a speaker 61 is connected to the speaker out connector, and handset 13 is connected to the speaker out connector and the microphone connector.

Figure 7:
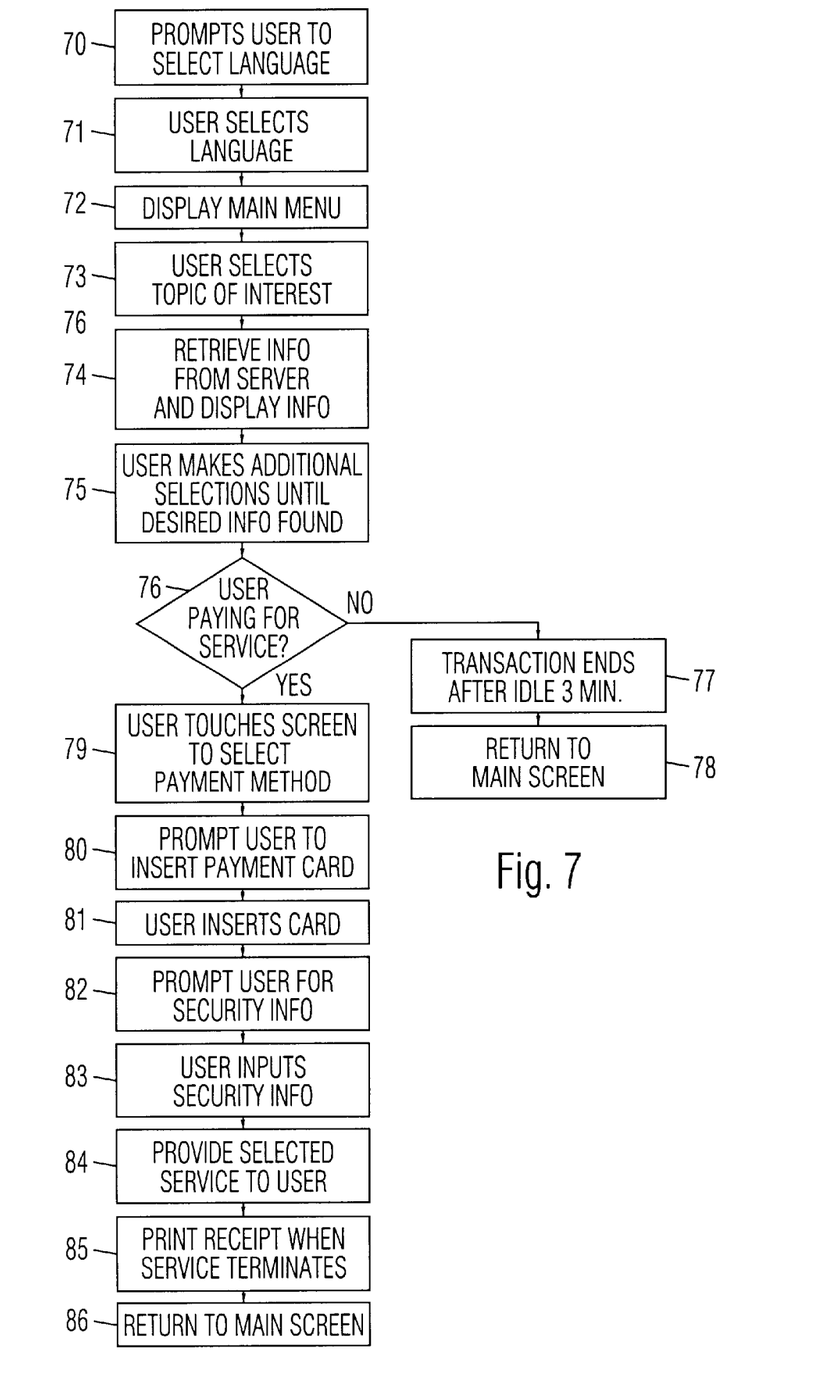
FIG. 7 is a flowchart showing an exemplar function thereof.

FIG. 7

The hard disk is preloaded with an operating system, such as Microsoft Windows, and all the drivers for the connected peripherals. A CD drive connected to the single board computer enables the operator to load any application software for using the built-in features on the single board computer and the connected peripherals to perform a variety of communication, information retrieval, and financial functions. Alternatively, application software may also be preloaded and the CD drive may be eliminated. The application software must provide on-screen menus and buttons for the user to make selections since the system has no externally accessible keyboard or mouse. Due to the absence of mechanical buttons that provide tactile and audio feedback, the application software is preferably arranged to provide audio feedback for item selection.

The rugged and compact system is most suited for use in public and unfriendly environments where appliances are subject to abuse and vandalism, such as the arraignment facilities in police departments, jails, and prisons. For such applications, the system may be loaded with suitable software and connected to remote servers that provide information on attorneys, bail bond services, and paralegal services. Internet access and telephone service may also be provided. Telephone functions may be provided with suitable telecommunications software using the full-duplex modem. Fees may be collected through the card reader for vending the services. Video or still images of the user may be captured with the camera and stored locally on the hard disk, or uploaded to a remote server. The use of the system, such as the information accessed and the services used, may be recorded and stored on the hard disk or uploaded to the remote service for record keeping.

An exemplar use of the system is shown in FIG. 7. The user is prompted to select the language at block 70. After the language is selected at block 71, the main menu is displayed at block 72. A topic or item of interest on the menu is selected by the user at block 73. The corresponding information for the selected item is retrieved from a remote network server, such as Web based information, and displayed at block 74. The user may select other items on submenus or Web pages until the desired information is found at block 75. If the user is not paying for a service at block 76, the transaction is terminated after a period of idle time at block 77, and the system is returned to the main screen at block 78. If the user has selected a service which requires a fee, a payment screen is displayed. The payment method is selected by the user at block 79, and the user is prompted to insert a payment card at block 80, such as a credit card, ATM card, or smart card. The card is inserted at block 81. The user is prompted for security information at block 82, such as a PIN number or password. The security information is entered at block 83. The selected service is provided to the user at block 84, and a receipt is printed for the user at block 85 at the end of the service. The system is returned to the main screen at block 86.

Although the foregoing description is specific, it should not be considered as a limitation on the scope of the invention, but only as an example of the preferred embodiment. Many variations are possible within the teachings of the invention. Therefore, the scope of the invention should be determined by the appended claims and their legal equivalents, not by the examples given.

We claim:

1. A wall-mounted touch screen information system, comprising:
   a vandal resistant housing for installation on a mounting wall;
   a vandal resistant telephone handset detachably supported in a cradle on a side of said housing and connected to said housing by an armored cable;
   a vandal resistant front cover hinged to a front edge of said housing;
   a touch screen attached to a rear of said front cover behind a screen opening, wherein said touch screen is comprised of a LCD panel positioned behind a vandal resistant transparent touch panel;
   a camera attached to said rear of said front cover behind a camera opening and generally centered above said touch screen for a direct view of a user standing in front of said touch screen;
   a card reader attached to said rear of said front cover behind a card reader opening;
   a spool printer attached to said rear of said front cover behind a printer opening;
   a front cover lock attached to said front cover and locking said front cover closed against said housing;
   a single board personal computer positioned inside said housing and connected to said handset, said touch screen, said camera, said card reader, and said printer, wherein said single board computer includes a CPU, a memory slot with a memory module, a video controller, an IDE controller, an audio controller, an Ethernet interface, a full-duplex fax/modem, a keyboard port, a mouse port, plural USB ports, a parallel port, a microphone-in connector, and a speaker-out connector; and
   a hard disk, a power supply, and a power switch positioned inside said housing and connected to said single board computer;
   wherein said hard disk, and all connectors on said single board computer inside said housing are inaccessible when said front cover is closed, and only said handset, said touch screen, said card reader, and said printer are accessible when said front cover is closed.

2. A wall-mounted touch screen information system of claim 1, wherein said card reader is comprised of a combined magnetic card and smart card reader capable of reading magnetic strip cards and smart cards with embedded microprocessors.

3. A wall-mounted touch screen information system of claim 1, further including software loaded on said hard disk to provide an entirely menu and button driven interface on said touch screen since said information system has no externally accessible keyboard and no externally accessible mouse, and due to an absence of mechanical buttons that provide tactile and audio feedback, said software is arranged to provide audio feedback when menus and buttons are pressed.

4. A wall-mounted touch screen information system, comprising:
   a vandal resistant housing for installation on a mounting wall;
   ventilation holes positioned through a bottom surface of said housing to minimize dust intrusion and resist vandalism;
   a vandal resistant telephone handset detachably supported in a cradle on a side of said housing and connected to said housing by an armored cable;
   a front cover hinged to a front edge of said housing;
   a touch screen attached to a rear of said front cover behind a screen opening, wherein said touch screen is comprised of a LCD panel positioned behind a vandal resistant transparent touch panel;
   a camera attached to said rear of said front cover behind a camera opening and centered above said touch screen for a direct view of a user standing in front of said touch screen;
   a card reader attached to said rear of said front cover behind a card reader opening;
   a spool printer attached to said rear of said front cover behind a printer opening;
   a front cover lock attached to said front cover and locking said front cover closed against said housing;
   a rearward projecting lip positioned around a rear perimeter of said housing to space a rear surface of said housing from said mounting wall;
   a plurality of rearward projecting studs arranged on said rear surface of said housing, wherein rear surfaces of said studs are coplanar with a rear edge of said lip, said studs include respective holes for passing fasteners inserted from inside said housing into said mounting wall for protecting said fasteners from tampering when said front cover is closed and locked;

a notch on said lip for passing an electrical conduit attached to a surface of said mounting wall;

a cable opening on said rear surface of said housing for passing power and communication cables into said housing;

a fan attached to said housing;

a single board personal computer positioned inside said housing and connected to said handset, said touch screen, said camera, said card reader, and said printer, wherein said single board computer includes a CPU, a memory slot with a memory module, a video controller, an IDE controller, an audio controller, an Ethernet interface, a full-duplex fax/modem, a keyboard port, a mouse port, plural USB ports, a parallel port, a microphone-in connector, and a speaker-out connector;

a hard disk, a CD drive, a power supply, and a power switch positioned inside said housing and connected to said single board computer;

wherein said hard disk, and all connectors on said single board computer inside said housing are inaccessible when said front cover is closed, and only said handset, said touch screen, said card reader, and said printer are accessible when said front cover is closed.

5. A wall-mounted touch screen information system of claim 4, wherein said card reader is comprised of a combined magnetic card and smart card reader capable of reading magnetic strip cards and smart cards with embedded microprocessors.

6. A wall-mounted touch screen information system of claim 4, further including software loaded on said hard disk to provide an entirely menu and button driven interface on said touch screen since said information system has no externally accessible keyboard and no externally accessible mouse, and due to an absence of mechanical buttons that provide tactile and audio feedback, said software is arranged to provide audio feedback when menus and buttons are pressed.

* * * * *